A. G. STEINMAYER

Jan. 3, 1933. STREET LIGHTING FIXTURE Re. 18,707

2 Sheets-Sheet 1

Original Filed Dec. 27, 1926

Inventor
Alwin G. Steinmayer
By Ira Milton Jones
Attorney

A. G. STEINMAYER

Jan. 3, 1933. STREET LIGHTING FIXTURE Re. 18,707

2 Sheets-Sheet 2

Original Filed Dec. 27, 1926

Inventor

Alvin G. Steinmayer

By Ira Milton Jones

Attorney

Reissued Jan. 3, 1933

Re. 18,707

UNITED STATES PATENT OFFICE

ALWIN G. STEINMAYER, OF MILWAUKEE, WISCONSIN, ASSIGNOR, BY MESNE ASSIGNMENTS, TO LINE MATERIAL COMPANY, OF SOUTH MILWAUKEE, WISCONSIN, A CORPORATION OF DELAWARE

STREET-LIGHTING FIXTURE

Original No. 1,734,056, dated November 5, 1929, Serial No. 157,194, filed December 27, 1926. Application for reissue filed October 15, 1931. Serial No. 569,095.

This invention relates to a supporting structure, for example, such structures as are commonly employed to support globes, reflectors and bulbs of street lights.

In the series system of street lighting, which is the system most commonly used, a certain impressed voltage is passed through a series of lamps, all having the same amperage capacity, producing a resultant voltage drop in each lamp and hence the impressed voltage is proportioned to the number of lamps, and where a large area is to be illuminated there will necessarily be a large number of lamps and hence the impressed voltage is relatively high.

Heretofore, the impressed voltage and the number of lamps has been limited by the insulating capacity of the supporting structure or housing of the lighting fixtures, and this invention has for one of its objects to provide a lighting fixture housing constructed of wet process porcelain to have an insulating capacity sufficient to withstand the necessary higher voltages.

As wet process porcelain, due to its nature, is necessarily a turned product and is best worked in its dry stage, this invention has as another object to provide an insulator supporting structure so constructed that it may be turned from a solid plug or block of process clay.

Another object of this invention resides in the provision of means whereby a socket support and the usual refractor holder and shade may be mounted in the housing by a single mounting means so as to reduce the design of the housing to its simplest form.

A further object of this invention is to device means for dead ending the leads or conductor lines to the housing without deviating from the simplicity of the housing design.

With the above and other objects in view, which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated three complete examples of the physical embodiment of my invention constructed according to the best mode I have so far devised for the practical application of the principles thereof, and in which:

Figure 2 is a sectional view taken through Figure 1 on the plane of the line 2—2;

Referring now more particularly to the accompanying drawings, in which like numerals designate like parts throughout the several views, numeral 6 designates a cup-shaped housing or body portion of a lighting fixture formed of wet process porcelain by turning the same from a solid plug or block of process clay. A hood or canopy 7 suitably secured to the upper portion of the housing by screws or like means 8 provides means for supporting the fixtures in any desired manner.

Figure 1:
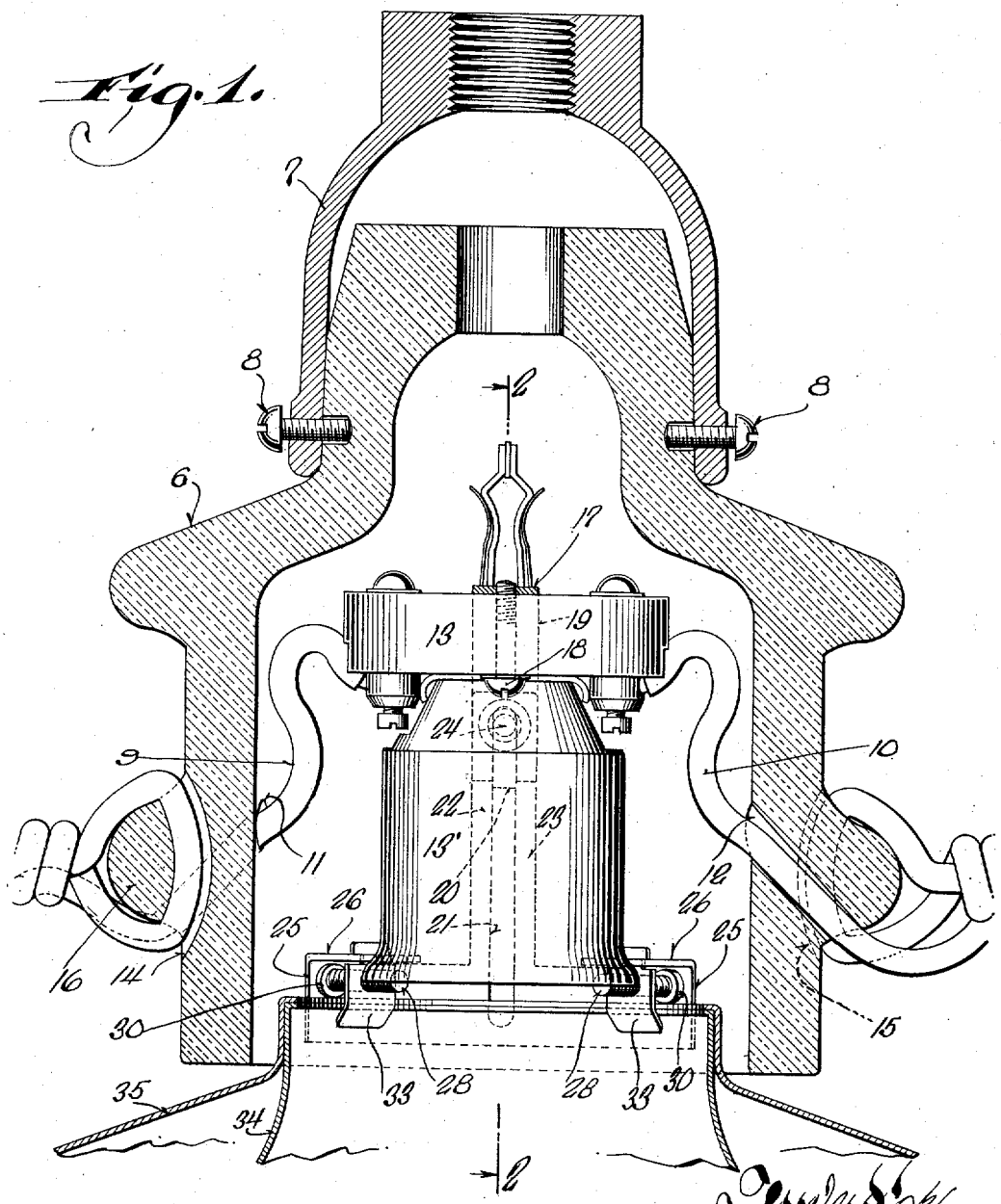
Figure 1 is a view, partly in elevation and partly in section, illustrating a street lighting fixture constructed according to my invention.
Figure 1:
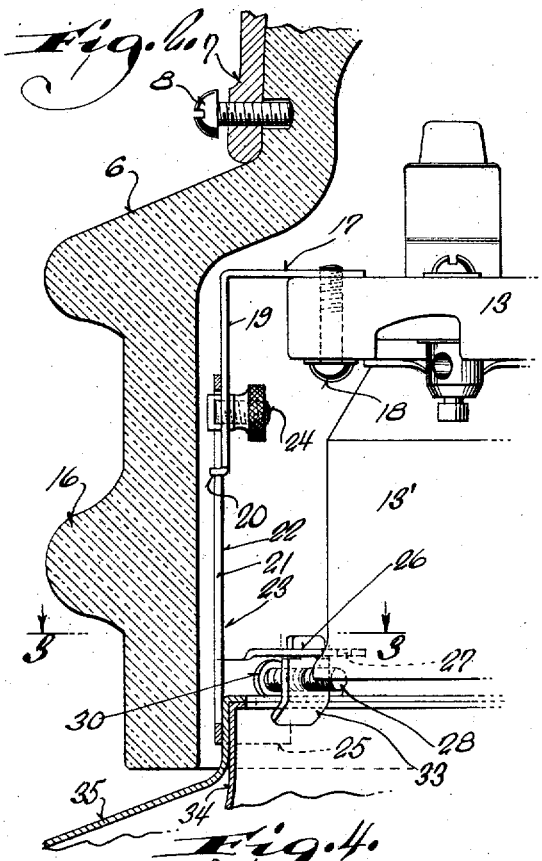

Lead wires or conductors 9 and 10 enter the housing through apertures 11 and 12, respectively, to be connected with the usual terminals of a socket support 13 adjustably mounted within the housing in a manner to be later described, as socket 13′ being removably connected with the socket support. The lead wires 9 and 10 are passed through bores 14 and 15 formed in an annular rib 16 and twisted about each other to securely dead end the same to the housing before being passed through apertures 11 and 12, as best illustrated in Figure 1.

The means for adjustably mounting the socket support 13 within the housing includes a pair of bracket members 17 bent of approximately right angular shape with their lateral portions connected with the socket support at diametrically opposite points by screws or other means 18. The downwardly extended or vertical portions 19 of the members 17 each have a laterally and outwardly extended stud 20 formed at their lower extremity to ride in the longitudinal slot 21 of the vertical portion 22 of the adjacent one of a pair of supporting frames 23. A bolt member 24 passes through an aperture in the portion 19 and through slot 21 in each supporting frame, between the head of which and a nut threaded thereon the portion 19 and the portion 22 are clamped together, the bolt and the laterally extended stud 20 with which it cooperates being slidable in the slot 21.

It will be understood that the construction above described is duplicated on diametrically opposite sides of the lamp structure, and that the description of one will suffice for the other.

Figure 3:
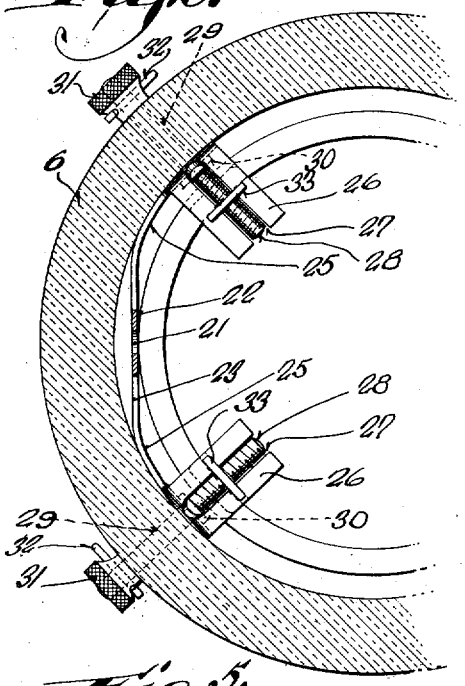
Figure 3 is a cross-sectional view taken through Figure 2 on the plane of the line 3—3.

Each supporting frame 23 has a pair of oppositely extending portions 25 which extend circumferentially about the inner periphery of the housing 6 for a distance of substantially one-eighth of the circumference thereof and each portion carries at the upper side of its outer extremity a projection 26 extending radially inward of the housing 6, each projection being slotted, as at 27, for the purpose later described (see Figure 3).

The supporting frame 23 is readily removably secured to the housing 6 by studs 28 which pass through and are freely rotatable in apertures in the outer extremity of each portion 25 and in apertures 29 in the lower portion of the insulator housing 6. Each stud 28 is formed with a shoulder 30 which engages the inner side of the portion 25 through which it is passed, and is held against longitudinal movement by a knurled head 31 which is secured to the outer end of the stud by a cotter pin or other suitable means 32. Thus it will be seen that the studs are free to be rotated from the outside of the housing by manipulation of the head 31 and that the supporting frame is secured to the housing 6.

That portion of the stud 28 which extends inwardly of the shoulder 30 is threaded to receive a binding member 33 which is cut away on each side at its upper end to ride within the slot 27 in the member 26. The lower end of each member 33 is bent outwardly to engage the upper inner periphery of a refractor holder 34 and a reflector 35. It will be readily apparent that the stud 28 may be threaded into the member 33 to rigidly bind the refractor holder and reflector together and to the housing.

Figure 4:
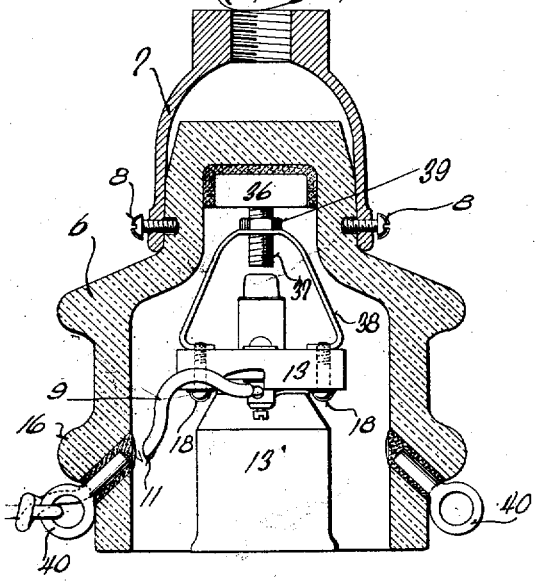
Figure 4 is a sectional view similar to Figure 1 of a slightly modified form of my invention.

In Figure 4, I have illustrated a modified form of my invention in which the means for adjustably mounting the socket support includes a head member 36 carrying a threaded downwardly extending stud 37, cemented in the upper portion of the housing. A substantially U-shaped supporting strip 38 has its upper or medial portion threaded onto the stud 37 and its lower or outer end secured to the socket support by screws 18, a locking nut 39 securing the member 37 in any desired position. This view also illustrates a modified means for anchoring or dead ending the line wires 9 and 10 to the insulator housing which consists of an eye 40 cemented in an aperture in the housing member through which the lines may be looped and then twisted about each other in the manner heretobefore described.

Figure 5:
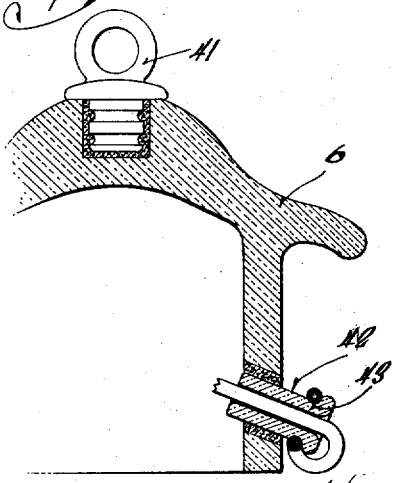
Figure 5 is a sectional view illustrating another modified form of my invention.

In Figure 5 I have illustrated another modified form of my invention in which the usual head or canopy is replaced by a ring member 41 which is cemented into a pocket in the upper portion of the housing as illustrated. Another means for dead ending the line is also depicted in this view in which a tubular plug member 42 is cemented in an aperture in the lower portion of the housing, the line wire being passed through the bore of the plug member and being wound about the outer end of the same which is grooved, as at 43.

From the foregoing description taken in connection with the accompanying drawings it will be readily apparent to those skilled in the art to which an invention of this character appertains that I have provided an insulating housing for lamp fixtures which is extremely simple of construction and which may be formed of wet process porcelain by turning the same from a solid block of process clay.

It is to be noted that in each form of the invention, the supporting canopy 7 is of smaller external diameter than the external diameter of the annular side wall and is secured to the insulator by means of a small neck formed integrally with the insulator. By this construction, the canopy is prevented from overhanging the side walls and better break-down insulating characteristics are secured. Also, an annular rib or flange is formed integrally with the annular side wall and projects outwardly therefrom, thereby additionally increasing the break-down insulating characteristics of the structure. These features have been found to be highly desirable as the device is used for exposed or street lighting purposes, and is therefore exposed to rain and sleet.

What I claim as my invention is:

1. A device of the character described, comprising a housing, a socket receptacle adapted to be positioned within the housing, a bracket member extended downwardly from the receptacle, a supporting frame, means for longitudinally adjustably connecting the bracket member with the supporting frame, a light modifier, and means for clamping the light modifier to the supporting frame, said lastmentioned means passing through an aperture in the housing and securing the supporting frame within the housing.

2. A lamp structure, comprising an inverted cup-shaped insulator having a plurality of circumferentially spaced apertures adjacent its lower edge, supporting frames each having a correspondingly spaced opening adjacent each end, a forked projection on each end of the frame adjacent the respective opening, a clamping lug slidable in the fork of each projection and having a screw threaded aperture, a light modifier adapted to be engaged by the lugs, and screw threaded means adapted to pass through the aligned openings in the insulator and frames and threaded into the threaded apertures whereby the insulator, frames and light modifier are detachably secured together.

3. A light supporting structure comprising an inverted cup-shaped housing having spaced apertures through its walls adjacent the lower portion thereof, a socket receptacle, and a light modifier, a supporting frame, means adjustably mounting the socket receptacle from the supporting frame, clamping means engageable with the light modifier to mount the same, and means passed through the apertures in the housing to secure the supporting frame therein and engage the clamping means with the light modifier.

4. A light supporting structure comprising a housing, a socket receptacle and a light modifier, means for mounting the receptacle and light modifier within the housing and including a substantially inverted T-shaped supporting frame, transversely extending slotted projections at the ends of the T and clamping means carried by the projections and adapted to ride in said slots to engage the light modifier and support the same.

5. A lamp structure, comprising an inverted cup-shaped insulator having substantially radial apertures adjacent its lower portion and having a top wall, a socket support located within said cup-shaped insulator, a frame supporting said socket support, means passing substantially radially through said apertures for securing said frame in place, and exteriorly located means rigid with said cup-shaped insulator for anchoring wires thereto.

6. In a lighting fixture of the character described, a housing having all portions thereof annular and symmetrical about its central longitudinal axis and formed from a solid plug of wet process clay, said housing being closed by a top wall extending transversely thereacross and providing an unobstructed, inverted, cup-shaped interior surrounded by a single annular wall and closed by said top wall said housing having an annular external integral flange provided with apertures for anchoring line wires thereto.

7. A lamp structure, comprising an inverted cup-shaped insulator having a top wall and having an annular vertical wall integral with said top wall, said insulator providing an unobstructed, downwardly opening cup-shaped recess defined by the annular and top walls, a socket support located within said cup-shaped insulator, said insulator having openings through the side wall for the passage therethrough of conductors, conductor anchoring means formed externally of, and integrally with said side wall adjacent said openings, and an annular flange formed externally of, and integrally with said insulator and located above said openings and said conductor anchoring means.

8. A lamp structure comprising an inverted cup-shaped insulator having a top wall and having an annular vertical wall integral with said top wall and having an upwardly projecting neck of smaller external diameter than the external diameter of said annular vertical wall, said insulator providing an unobstructed, downwardly opening cup-shaped recess defined by said annular and top walls, a socket support located within said cup-shaped insulator, said insulator having openings through said annular wall for the passage of conductors, conductor anchoring means carried by said annular wall and located externally thereof, a canopy secured to said neck, the external diameter of said canopy being less than the external diameter of said annular wall, and an annular flange formed integrally with said annular wall and located above said conductor anchoring means and said openings.

In testimony whereof, the signature of the inventor is affixed hereto.

ALWIN G. STEINMAYER.